(12) United States Patent
Bacon, Jr. et al.

(10) Patent No.: US 7,195,360 B2
(45) Date of Patent: Mar. 27, 2007

(54) PRISMATIC RETROREFLECTIVE ARTICLE AND METHOD

(75) Inventors: Chester A. Bacon, Jr., Oakdale, MN (US); Seth M. Kirk, Minneapolis, MN (US); Moses M. David, Woodbury, MN (US); Michael D. Currens, Eagan, MN (US); Osei A. Owusu, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 11/023,857

(22) Filed: Dec. 28, 2004

(65) Prior Publication Data

US 2006/0139754 A1  Jun. 29, 2006

(51) Int. Cl.
*G02B 5/122* (2006.01)
(52) U.S. Cl. ........................................ 359/529
(58) Field of Classification Search ............... 359/515, 359/516, 518, 528, 529, 530, 531, 541, 547–553
See application file for complete search history.

(56) References Cited

U.S. PATENT DOCUMENTS

| | | | |
|---|---|---|---|
| 3,222,204 A | 12/1965 | Weber et al. | |
| 3,684,348 A | 8/1972 | Rowland | |
| 3,689,346 A | 9/1972 | Rowland | |
| 3,712,706 A | 1/1973 | Stamm | |
| 3,811,983 A | 5/1974 | Rowland | |
| 3,817,596 A | 6/1974 | Tanaka | |
| 3,830,682 A | 8/1974 | Rowland | |
| 3,975,083 A | 8/1976 | Rowland | |
| 4,025,159 A | 5/1977 | McGrath | |
| 4,202,600 A | 5/1980 | Burke et al. | |
| 4,243,618 A | 1/1981 | Van Arnam | |
| 4,332,847 A | 6/1982 | Rowland | |
| 4,349,598 A | 9/1982 | White | |
| 4,576,850 A | 3/1986 | Martens | |
| 4,588,258 A | 5/1986 | Hoopman | |
| 4,609,587 A | 9/1986 | Giordano et al. | |
| 4,618,518 A | 10/1986 | Pricone et al. | |
| 4,668,558 A | 5/1987 | Barber | |
| 4,672,089 A | 6/1987 | Pricone et al. | |

(Continued)

FOREIGN PATENT DOCUMENTS

JP  08-309929  11/1996

(Continued)

OTHER PUBLICATIONS

Chester A. Bacon, Jr., U.S. Appl. No. 60/639,713, "Prismatic Retroreflective Article with Fluorine- or Silicon-containing Prisms", filed Dec. 28, 2004.

(Continued)

*Primary Examiner*—Euncha Cherry
(74) *Attorney, Agent, or Firm*—Jay R. Pralle; Nicole J. Einerson

(57) ABSTRACT

A prismatic retroreflective article has a transparent body portion and a layer of internally reflecting cube-corner optical elements having an open air-exposed rear surface at least a portion of which is more hydrophobic, more oleophobic, or both more hydrophobic and more oleophobic than the underlying cube-corner optical element. The article may be made by providing a transparent body portion bearing a layer of internally reflecting open air-exposed cube-corner optical elements; treating or coating at least a portion of the cube-corner elements to make the treated or coated portion more hydrophobic, more oleophobic, or both more hydrophobic and more oleophobic than the underlying cube-corner optical elements; and leaving such treated or coated portion exposed to the open air.

21 Claims, 4 Drawing Sheets

U.S. PATENT DOCUMENTS

| | | |
|---|---|---|
| 4,722,515 A | 2/1988 | Ham |
| 4,755,425 A | 7/1988 | Huang |
| 4,756,931 A | 7/1988 | Giordano et al. |
| 4,775,219 A | 10/1988 | Appeldorn et al. |
| 4,801,193 A | 1/1989 | Martin |
| 4,842,893 A | 6/1989 | Yializis et al. |
| 4,852,885 A | 8/1989 | Baratpour et al. |
| 4,895,428 A | 1/1990 | Nelson et al. |
| 4,938,563 A | 7/1990 | Nelson et al. |
| 4,954,371 A | 9/1990 | Yializis |
| 5,041,304 A | 8/1991 | Kusano et al. |
| 5,069,577 A | 12/1991 | Murphy |
| 5,073,404 A | 12/1991 | Huang |
| 5,097,800 A | 3/1992 | Shaw et al. |
| 5,138,488 A | 8/1992 | Szczech |
| 5,200,262 A | 4/1993 | Li |
| 5,213,872 A | 5/1993 | Pricone et al. |
| 5,229,882 A | 7/1993 | Rowland |
| 5,236,751 A | 8/1993 | Martin et al. |
| 5,264,063 A | 11/1993 | Martin |
| 5,324,566 A | 6/1994 | Ogawa et al. |
| 5,376,431 A | 12/1994 | Rowland |
| 5,395,644 A | 3/1995 | Affinito |
| 5,415,911 A * | 5/1995 | Zampa et al. ............... 428/41.8 |
| 5,450,235 A | 9/1995 | Smith et al. |
| 5,491,586 A | 2/1996 | Phillips |
| 5,508,084 A | 4/1996 | Reeves et al. |
| 5,512,219 A | 4/1996 | Rowland et al. |
| 5,557,836 A | 9/1996 | Smith et al. |
| 5,558,740 A | 9/1996 | Bernard et al. |
| 5,559,634 A | 9/1996 | Weber |
| 5,564,870 A | 10/1996 | Benson et al. |
| 5,592,330 A | 1/1997 | Bernard |
| 5,600,484 A | 2/1997 | Benson et al. |
| 5,614,286 A | 3/1997 | Bacon, Jr. et al. |
| 5,637,173 A | 6/1997 | Martin et al. |
| 5,648,145 A | 7/1997 | Martin |
| 5,691,846 A | 11/1997 | Benson, Jr. et al. |
| 5,812,317 A | 9/1998 | Billingsley et al. |
| 5,831,766 A | 11/1998 | Martin et al. |
| 5,851,674 A | 12/1998 | Pellerite et al. |
| 5,888,594 A | 3/1999 | David et al. |
| 5,888,618 A | 3/1999 | Martin |
| 5,930,041 A | 7/1999 | Thielman |
| 5,939,182 A | 8/1999 | Huang et al. |
| 5,948,166 A | 9/1999 | David et al. |
| 6,015,214 A | 1/2000 | Heenan et al. |
| 6,127,020 A | 10/2000 | Bacon, Jr. et al. |
| 6,132,861 A | 10/2000 | Kang et al. |
| 6,172,810 B1 | 1/2001 | Fleming et al. |
| 6,191,200 B1 | 2/2001 | Phillips |
| 6,224,219 B1 * | 5/2001 | Fleming et al. ............. 359/530 |
| 6,228,434 B1 | 5/2001 | Affinito |
| 6,243,112 B1 | 6/2001 | Kuhman et al. |
| 6,243,201 B1 | 6/2001 | Fleming et al. |
| 6,245,833 B1 | 6/2001 | Kang et al. |
| 6,258,443 B1 | 7/2001 | Nilsen et al. |
| 6,265,061 B1 | 7/2001 | Kang et al. |
| 6,274,221 B2 | 8/2001 | Smith et al. |
| 6,277,485 B1 | 8/2001 | Invie et al. |
| RE37,377 E * | 9/2001 | Gunjima et al. ............... 349/9 |
| 6,350,034 B1 | 2/2002 | Fleming et al. |
| 6,350,035 B1 | 2/2002 | Smith et al. |
| 6,386,699 B1 | 5/2002 | Ylitalo et al. |
| 6,440,334 B2 * | 8/2002 | Currens et al. ............ 264/1.34 |
| 6,440,550 B1 | 8/2002 | Hacker |
| 6,444,275 B1 | 9/2002 | Kuhman et al. |
| 6,503,564 B1 | 1/2003 | Fleming et al. |
| 6,541,591 B2 | 4/2003 | Olson et al. |
| 6,582,759 B1 | 6/2003 | Qiu et al. |
| 6,590,711 B1 | 7/2003 | Gardner et al. |
| 6,632,508 B1 | 10/2003 | Pellerite et al. |
| 6,649,249 B1 | 11/2003 | Engle et al. |
| 6,660,389 B2 | 12/2003 | Liu et al. |
| 6,664,354 B2 | 12/2003 | Savu et al. |
| 6,685,323 B1 | 2/2004 | Mimura et al. |
| 6,734,227 B2 | 5/2004 | Jing et al. |
| 6,767,102 B1 | 7/2004 | Heenan et al. |
| 6,802,616 B2 | 10/2004 | Mimura |
| 6,811,829 B2 | 11/2004 | Affinito et al. |
| 6,815,040 B2 | 11/2004 | Pellerite et al. |
| 6,815,043 B2 | 11/2004 | Fleming et al. |
| 6,817,724 B2 | 11/2004 | Mimura et al. |
| 2001/0008679 A1 | 7/2001 | Smith et al. |
| 2002/0090515 A1 | 7/2002 | Pellerite et al. |
| 2003/0001931 A1 | 1/2003 | Isono |
| 2003/0134515 A1 | 7/2003 | David et al. |
| 2003/0134949 A1 | 7/2003 | Brown |
| 2003/0170426 A1 | 9/2003 | Thielman |
| 2003/0198814 A1 | 10/2003 | Khieu et al. |
| 2003/0203186 A1 | 10/2003 | Jing et al. |
| 2003/0235677 A1 | 12/2003 | Hanschen et al. |
| 2003/0235678 A1 | 12/2003 | Graham et al. |
| 2004/0130057 A1 | 7/2004 | Mehrabi et al. |
| 2004/0191481 A1 | 9/2004 | Erb et al. |
| 2004/0229014 A1 | 11/2004 | Schulz et al. |
| 2004/0229018 A1 | 11/2004 | Graham et al. |

FOREIGN PATENT DOCUMENTS

| | | |
|---|---|---|
| WO | WO 97/31357 | 8/1997 |
| WO | WO 99/57185 | 11/1999 |
| WO | WO 00/50931 | 8/2000 |
| WO | WO 02/099476 A2 | 12/2002 |
| WO | WO 02/099476 A3 | 12/2002 |

OTHER PUBLICATIONS

Chester A. Bacon, Jr., U.S. Appl. No. 11/319,965, "Prismatic Retroreflective Article with Fluorine- or Silicon-containing Prisms", filed Dec. 28, 2005.

* cited by examiner

PRISMATIC RETROREFLECTIVE ARTICLE AND METHOD

FIELD OF THE INVENTION

This disclosure relates to prismatic retroreflective articles for use in applications including footwear, apparel, signage and pavement markings.

BACKGROUND

Prismatic retroreflective articles typically employ a multitude of cube-corner optical elements to retroreflect incident light. The cube-corner elements project from the back surface of a rigid or flexible transparent body portion. Incident light enters the article at a front surface, passes through the body portion, is internally reflected by the cube-corner element facets, returns through the body portion and subsequently exits the front surface and returns towards the light source. Reflection at the cube-corner facets can occur by total internal reflection when the cube-corner elements are encased in a lower refractive index media (e.g., air), or by specular reflection when the cube-corner elements are coated with a suitably reflective structure such as a vapor deposited aluminum coating or a refractive index-mismatched multilayer thin film coating. Various prismatic retroreflective articles and their manufacture are mentioned or disclosed in, for example, U.S. Pat. Nos. 3,684,348, 3,689,346, 3,712,706, 3,811,983, 3,817,596, 3,830,682, 3,975,083, 4,025,159, 4,202,600, 4,243,618, 4,332,847, 4,349,598, 4,576,850, 4,588,258, 4,618,518, 4,672,089, 4,775,219, 4,801,193, 4,895,428, 4,938,563, 5,069,577, 5,138,488, 5,213,872, 5,229,882, 5,236,751, 5,264,063, 5,376,431, 5,415,911, 5,450,235; 5,491,586, 5,512,219, 5,557,836, 5,558,740, 5,564,870, 5,592,330, 5,600,484, 5,614,286, 5,637,173, 5,648,145, 5,691,846, 5,831,766, 5,888,618, 5,930,041, 5,939,182, 6,015,214, 6,132,861, 6,172,810 B1, 6,191,200 B1, 6,258,443 B1, 6,265,061 B1, 6,274,221 B2, 6,350,035 B1, 6,503,564 B1, 6,685,323 B1, 6,802,616 B2, 6,815,043 B2 and 6,817,724 B2; in U.S. Patent Application Publication Nos. US 2003/0170426 A1 and US 2003/0198814 A1; and in International Application No. WO 97/31357.

Various other articles having microstructured layers or regions are mentioned or disclosed in, for example, U.S. Pat. Nos. 4,609,587, 609,587, 4,755,425, 5,073,404, 5,508,084, 5,559,634, 5,812,317, 6,127,020, 6,386,699 B1, 6,541,591 B2, 6,582,759 B1, 6,590,711 B1, 6,649,249 B1, 6,632,508 B1, 6,660, 389 B2, 6,734,227 B2 and 6,815,040 B2; in U.S. Patent Application Publication Nos. US 2003/0134949 A1, US 2003/0203186 A1 and US 2003/0235678 A1; in International Application No. WO 99/57185; and in Japanese Published Patent Application No. 08-309929.

SUMMARY OF THE INVENTION

For prismatic retroreflective articles in which the cube-corner elements are encased in a lower refractive index media, a rear cover film or other generally impermeable structure usually is sealed or otherwise adhered to some of the cube-corner elements, leaving the remaining cube-corner elements encased in the media inside chambers or cells formed by the cube-corner elements, the rear cover film and the sealing structure. For example, FIG. 6 shows a prior art prismatic retroreflective article 150 having front surface 152, body portion 154, air-encased cube-corner elements 156 and rear cover film 158. Rear cover film 158 is thermally welded to cube-corner elements 160 at seal legs 162. Air in cell or chamber 164 provides a lower refractive index media interface at the air-encased cube-corner elements and permits total internal reflection to take place in cube-corner elements 156 at facets such as facets 166 and 168. The cells 164 and rear cover film 158 protect the cube-corner elements from moisture, dirt or other contaminants and help maintain retroreflectivity. However, rear cover film 158 significantly increases the weight and cost of article 150, and the seal legs 162 reduce the number of cube-corner elements available for retroreflection.

In embodiments where flexibility is desired (e.g., for reflective footwear or apparel applications or for roll-up signs), body portion 154 and rear cover film 158 usually are made from a film that is relatively soft and flexible in comparison to the cube-corner element material. However, even when rear cover film 158 is fairly flexible, its presence can significantly increase article 150's overall stiffness.

Rear cover film 158 may be eliminated. However, the resulting retroreflective article can lose most or all of its retroreflectivity when the exposed cube-corner elements become wet or soiled. This can present particular problems in outdoor, athletic apparel, fire safety and underwater applications.

By employing open air-exposed internally reflecting cube-corner optical elements and making at least a part of the air-exposed cube-corner element surface more hydrophobic, more oleophobic, or both more hydrophobic and more oleophobic than the underlying cube-corner optical element, the rear cover film may be eliminated (thereby reducing cost, weight, stiffness and retroreflectivity loss due to seal leg formation), and retroreflectivity under wet conditions, dirty conditions, or both wet and dirty conditions can be at least partially maintained. The disclosure thus provides in one aspect a prismatic retroreflective article comprising a transparent body portion and a layer of internally reflecting cube-corner optical elements having an open air-exposed rear surface at least a portion of which is more hydrophobic, more oleophobic, or both more hydrophobic and more oleophobic than the underlying cube-corner optical element.

The disclosure provides in another aspect a prismatic retroreflective article comprising a transparent body portion and a layer of internally reflecting cube-corner optical elements at least partially covered with a substantially conformal open-air exposed transparent coating that reduces retroreflectivity loss when the elements are exposed to one or both of water or oil.

The disclosure provides, in another aspect, a method for making a prismatic retroreflective article comprising providing a transparent body portion bearing a layer of internally reflecting open air-exposed cube-corner optical elements; treating or coating at least a portion of the cube-corner optical elements to make the treated or coated portion more hydrophobic, more oleophobic, or both more hydrophobic and more oleophobic than the underlying cube-corner optical elements; and leaving such treated or coated portion exposed to the open air.

These and other aspects of the disclosure will be apparent from the accompanying drawing and this specification. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various drawings indicate like elements. The elements in the drawing are not to scale.

DETAILED DESCRIPTION

The words "a", "an", and "the" are used interchangeably with "at least one" to mean one or more of the elements being described. By using words of orientation such as "atop", "on", "uppermost", "underlying" and the like for the location of various elements in the disclosed articles, we refer to the relative position of an element with respect to a horizontally-disposed, downwardly-facing transparent body portion. We do not intend that the disclosed articles should have any particular orientation in space during or after their manufacture.

The "size" of an optical element refers to its characteristic width, depth, height, or length.

The phrases "index of refraction" and "refractive index" refer to a material property representing the ratio of the phase velocity of an electromagnetic wave in a vacuum to that in the material.

The word "light" refers to visible radiation. When used in connection with two or more elements in an optical path, the phrase "optical association" means that a significant portion of light transmitted along the path passes through the elements. A "retroreflective" article reflects obliquely incident incoming light in a direction parallel to the incident direction, or nearly so, such that an observer or detector at or near the light source can see or detect the reflected light. A "transparent" retroreflective element has a one-way transmission of at least about 5% (and more preferably at least about 10%, 20% or 50%) in a band at least 100 nm wide in a wavelength region of interest between about 400 nm and about 700 nm, measured along the normal axis. The phrase "internally reflecting" when used with respect to a cube-corner optical element refers to an element that reflects incident light back through the element primarily due to an air interface on the cube-corner element rear surface rather than due to a reflective coating (e.g., a metallized coating, a coating containing a reflective pigment or a stack of coating layers having a refractive index mismatch) on the cube-corner element rear surface.

The phrase "air-encased" when used with respect to a cube-corner element refers to an element having a rear surface in contact with air in a sealed cell. The phrase "open air-exposed" when used with respect to a cube-corner element refers to an element having a rear surface in contact with ambient air not encased in a sealed cell.

The word "polymer" includes homopolymers and copolymers, as well as homopolymers or copolymers that may be formed in a miscible blend, e.g., by coextrusion or by reaction, including, e.g., transesterification. The term "copolymer" includes both random and block copolymers. By a "crosslinked" polymer, we mean a polymer in which polymer chains are joined together by covalent chemical bonds, usually via crosslinking molecules or groups, to form a network polymer. A crosslinked polymer is generally characterized by insolubility, but may be swellable in the presence of an appropriate solvent.

Figure 1:
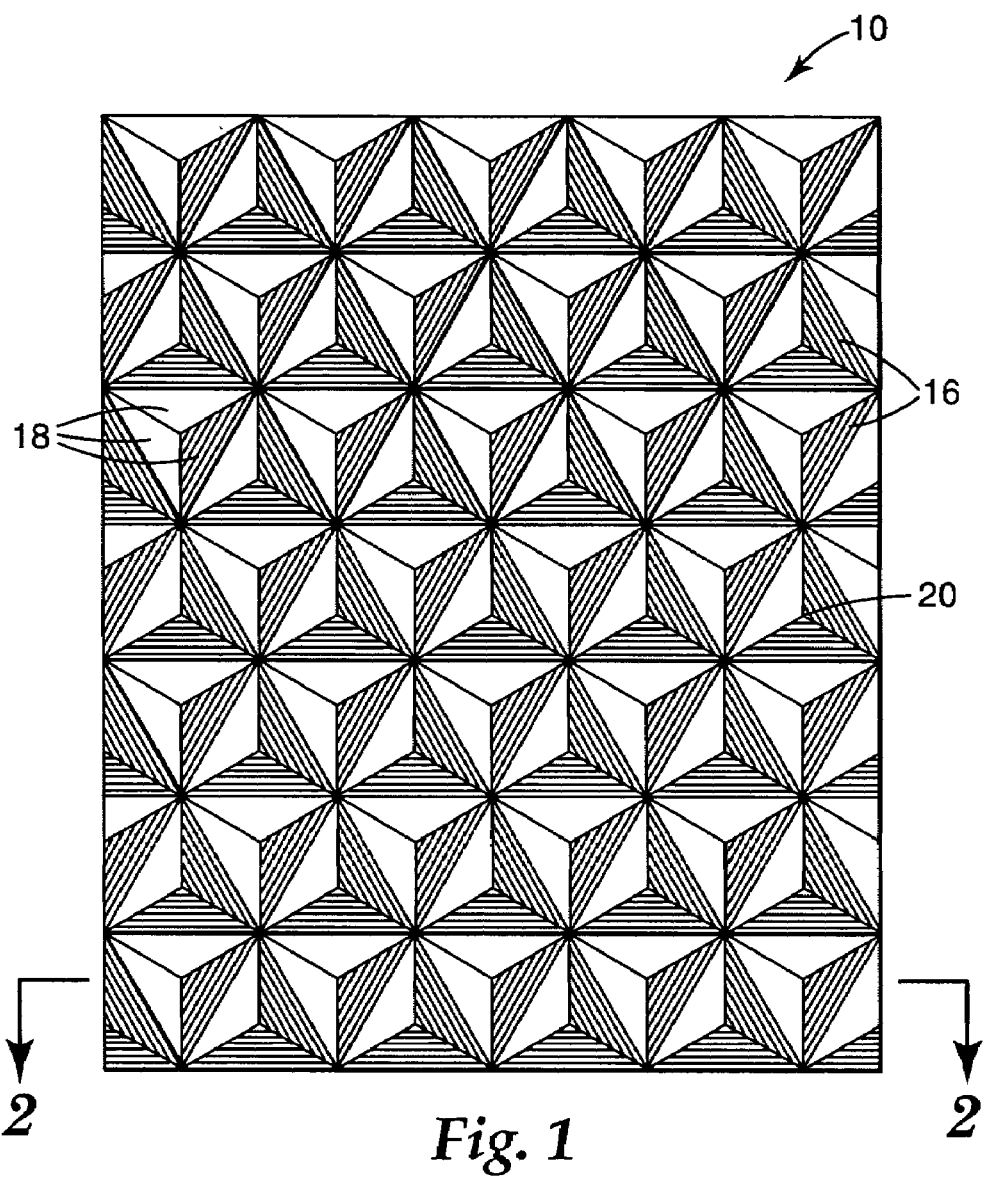
FIG. 1 is a plan view schematic representation of a portion of the open air-exposed cube-corner element rear surfaces in a disclosed cube-corner retroreflective article 10.

FIG. 1 shows a portion of a retroreflective article 10 having a plurality of cube-corner elements 16, each defined by three open-air exposed planar facets 18 arranged to form a trihedral pyramidal prism. The cube-corner optical elements 16 are disposed as matched pairs in an ordered array on one side of the sheeting and are shown to protrude out of the page of the drawing. The planar facets 18 may for example be substantially perpendicular to one another (as in the corner of a room). The angle between the facets 18 typically is the same for each cube-corner element in the array and is about 90°. The angle may however deviate from 90° as described, for example, in U.S. Pat. No. 4,775,219. Although the apex 20 of each cube-corner element 16 may be vertically aligned with the center of the cube-corner element base as described, for example, in U.S. Pat. No. 3,684,348, the apex also may be canted as described, for example, in U.S. Pat. No. 4,588,258. Thus, this disclosure is not limited to any particular cube-corner geometry and any of the geometries now known or hereafter developed may be employed.

Figure 2:
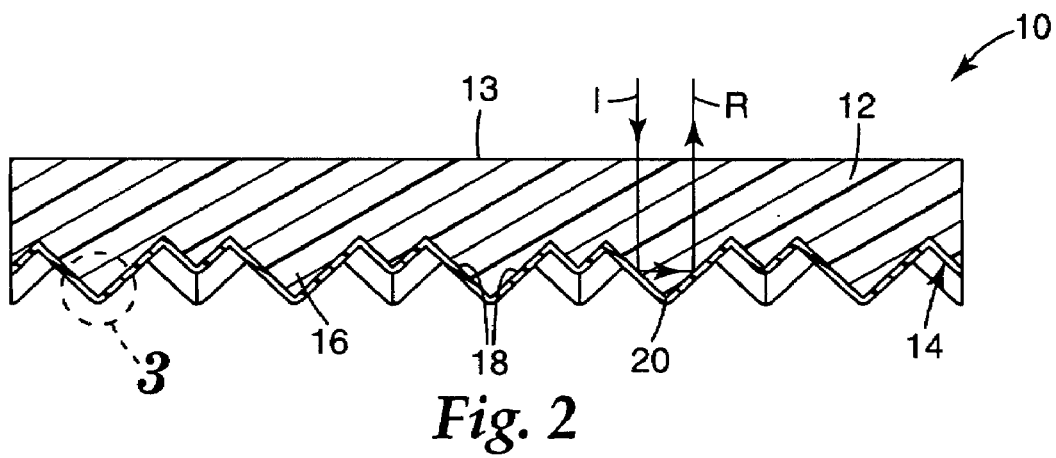
FIG. 2 is a cross-sectional representation of the cube-corner retroreflective article 10 taken along line 2—2.

FIG. 2 shows a cross-sectional representation of retroreflective article 10 taken along line 2—2 of FIG. 1. Retroreflective article 10 has a body portion 12 having front or incident surface 13 and a layer of internally reflecting cube-corner optical elements 16 projecting from and in optical association with body portion 12. The rear surfaces of the facets 18 are covered with a substantially conformal open-air exposed transparent low surface energy coating 14. Coating 14 reduces retroreflectivity loss when the elements 16 are exposed to one or both of water or oil, e.g., by discouraging adhesion and spreading of drops of water or oil that may come into contact with the coating. Thus even when the rear surface of article 10 is exposed to rainfall or other liquids, incident light I can enter body portion 12 through front side 13, pass into cube-corner optical elements 16, reflect off cube-corner facets 18 and be redirected in the general direction of the incident beam, as indicated by reflected light beam R.

Figure 3A:
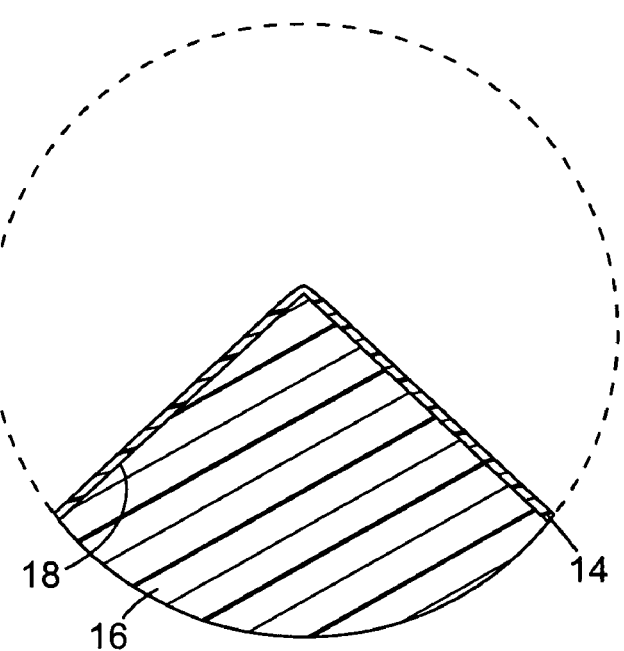
FIG. 3a is an enlarged inverted view of a portion of a cube-corner element 16 taken from region 3 of FIG. 2.

FIG. 3a shows a magnified view of the portion of the cube-corner element indicated by circle 3 in FIG. 2. As shown, coating 14 is formed from a single layer, but may if desired be formed from multiple layers whose refractive indexes match sufficiently so that coating 14 remains substantially transparent. Coating 14 desirably is sufficiently thin and of sufficiently uniform thickness so that it will conform closely to the profile of the cube-corner optical elements. Coating 14 may be applied using a variety of techniques including those discussed in more detail below. Coating 14 may for example have a thickness less than about 10% or less than about 5% of the cube-corner element height. Expressed on an absolute basis, coating 14 may for example have a thickness less than about 3 μm, less than about 2 μm, less than about 1 μm or even the thickness of a molecular monolayer. Coating 14 desirably has a sufficiently low surface energy so that water, mineral oil or both water and mineral oil will bead up rather than spreading when applied to coating 14.

Figure 3B:
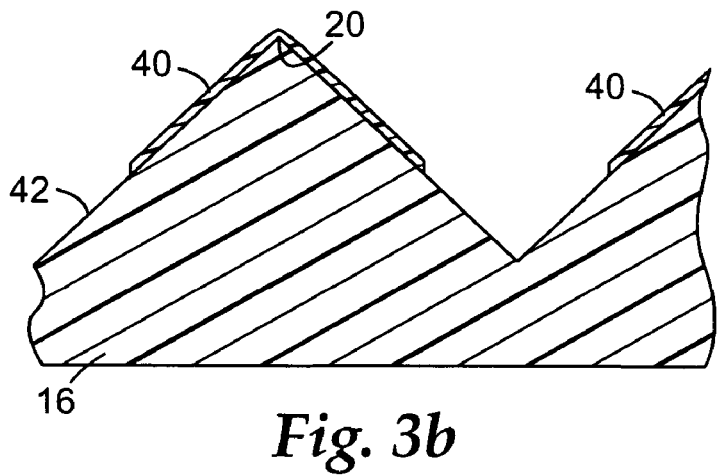
FIG. 3b is an enlarged inverted view of a portion of a cube-corner element 16 bearing a discontinuous coating.

FIG. 3*b* shows a magnified view of a portion of a cube-corner element 16 bearing a discontinuous coating 40 on surface 42, applied near apex 20 of cube-corner element 16. A discontinuous coating may, for example, cover a portion of many or a portion of each of the cube-corner elements. It may also cover all of some of the cube-corner elements but not others, e.g., to provide an indicia or pattern.

Figure 3C:
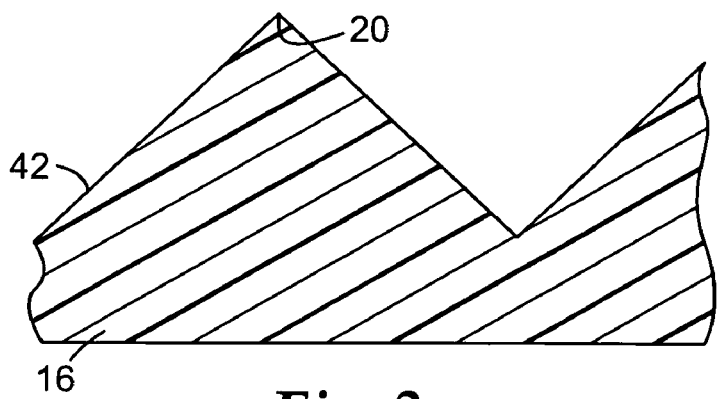
FIG. 3c is an enlarged inverted view of a portion of a cube-corner element 16 bearing a surface treatment.

FIG. 3*c* shows a magnified view of a portion of a cube-corner element 16 that has been treated to make the treated surface 42 hydrophobic, oleophobic or both hydrophobic and oleophobic. A cube-corner element that has been treated but not coated may not have a discernible coating but will have a detectable difference in surface properties caused by the treatment. Suitable treatments may be applied using a variety of techniques including those discussed in more detail below. The chosen treatment or treatments desirably impart to the cube-corner element surface a sufficiently low surface energy so that water, mineral oil or both water and mineral oil will bead up rather than spreading when applied to the surface.

The body portion 12 and the cube-corner optical elements 16 may be made from any suitable light transmissible material. A variety of such materials are described in the prismatic retroreflective article patents and applications mentioned above in the Background section and will be familiar to those skilled in the art. For example, body portion 12 may be flexible, extensible or rigid, and may be made from an inorganic material (e.g., glass) or a polymeric material (e.g., a polyurethane or plasticized or unplasticized polyvinyl chloride film) as desired. Cube-corner optical elements 16 usually are molded from a polymeric or polymerized thermoplastic or thermoset material (e.g., polymethyl methacrylate, polycarbonate, polyurethanes, unplasticized polyvinyl chlorides and epoxy acrylates) as desired.

Coating 14, when employed, may be inorganic (e.g., a transparent oxide or nitride film) or organic (e.g., a transparent polymeric or organometallic film). The composition of coating 14 will usually be chosen based on the composition of the cube-corner optical elements 16, in order to provide a coated surface that is more hydrophobic, more oleophobic or both more hydrophobic and more oleophobic than the underlying cube-corner optical elements. Coatings containing fluorine or silicon atoms (or containing fluorine or silicon atoms in higher proportions than in the underlying cube-corner optical elements) are especially desirable.

A variety of techniques may be employed to apply the desired coating or treatment to the cube-corner elements. Techniques that increase the number of fluorine or silicon atoms at the exposed cube-corner element surface are especially desirable. A variety of methods now known or later developed may be employed, including solvent-borne coating methods, liquid reactive coating methods, extrusion coating methods, gravure coating methods, physical and chemical vapor deposition methods, plasma deposition methods, film lamination methods and the like. Discontinuous coatings or treatments may be applied, for example, by using a suitable mask or a removable resist, or by coating or treating all or a larger than desired portion of the cube-corner elements and subsequently removing or neutralizing the coating or treatment in an undesired portion.

Exemplary coating techniques include condensing and polymerizing vapors of a fluorochemical acrylate, fluorochemical methacrylate, acrylic-functional siloxane or methacrylic-functional siloxane on the surface of the cube-corner elements (e.g., using the techniques described in U.S. Pat. No. 6,503,564 B1), coating the cube-corner elements with a fluoro/silane-containing ceramer hardcoat (e.g., using the materials described in U.S. Pat. No. 6,245,833 B1), coating the cube-corner elements with a transparent ceramer hardcoat followed by a solvent-borne fluorine-containing or silicon-containing antisoiling layer (e.g., using the materials described in U.S. Pat. No. 6,660,389 B2), coating the cube-corner elements with a self-assembling fluorine- or silicon-containing monomolecular antisoiling layer (e.g., using the materials described in U.S. Pat. Nos. 5,851,674 and 6,277,485 B1), coating the cube-corner elements with a solution of a low surface energy polymer such as poly-4-methyl-1-pentene, coating the cube-corner elements with a solution containing a suitable silane coupling agent (e.g., isobutyl trimethoxysilane, octyl trimethoxysilane, aminopropyltriethoxysilane, glycidoxypropyltrimethoxysilane, methacryloxypropyltrimethoxysilane or vinyltrimethoxysilane and other silanes described in U.S. Pat. No. 5,200,262), coating the cube-corner elements with a polymerized siloxane (e.g., a polydimethylsiloxane), coating the cube-corner elements with a silazane (e.g., hexamethyldisilazane) and coating the cube-corner elements with an organometallic material such as an organic titanate (e.g., isopropyl tri (dioctyl)phosphato titanate, dimethacryloxoethylene titanate or titanium(tetraisopropoxide)). Where a coating is employed, it may be applied directly to the cube-corner optical element rear surfaces, or to the mold in which such elements are formed and from which the coating can transfer. In general, is easier to form a conformal coating using techniques that involve application of a vapor rather than a liquid to the cube-corner optical element rear surfaces. When a liquid is applied to the cube-corner optical elements (e.g., when applying a coating from a solvent) it generally will be desirable to employ relatively low solids levels, as use of higher solids levels may make it difficult to form a conformal coating. It also generally will be desirable to employ solvents that do not leave residues.

Exemplary treatment techniques include a variety of methods in which active gas-phase species (such as free radicals, ions, or electrically or vibrationally excited states) are produced near the cube-corner elements. Often such methods involve electron impact with gaseous molecules, e.g., via coronas, corona discharges, barrier discharges, glow discharges, plasmas, nonequilibrium plasmas, silent discharges, partially ionized gases, filamentary discharges, direct or remote discharges, externally sustained or self-sustained discharges, and the like. Representative treatments include direct fluorine gas treatment, plasma treatment in the presence of fluorine or silicon atoms (e.g., in the presence of a perfluoroalkane such as perfluoropropane or perfluorobutane or of a silane such as trimethylsilane or tetramethylsilane), glow discharge or corona discharge treatment in a fluorine-containing atmosphere. Desirably the treated cube-corner optical elements have a sufficiently low surface energy so that water, mineral oil, or both water and mineral oil will bead up rather than spreading when applied to the cube-corner optical elements.

Figure 4:
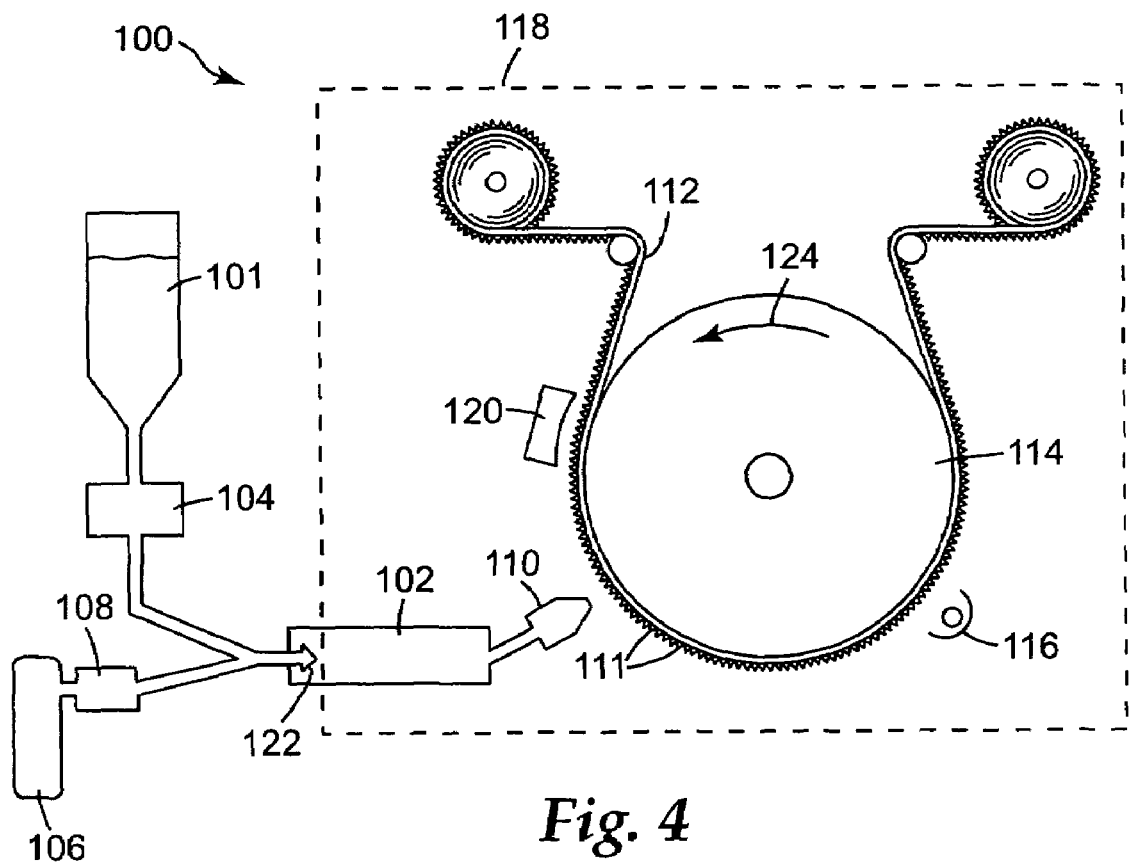
FIG. 4 is a schematic representation of a coating apparatus useful in the disclosed invention.

FIG. 4 shows a coating apparatus 100 for condensing and polymerizing vapors of a fluorochemical polymer on the surface of the cube-corner elements using deposition techniques like those described in U.S. Pat. Nos. 4,722,515, 4,842,893, 4,954,371, 5,097,800, 5,395,644 and 6,503,564 B1. Exemplary monomers and oligomers suitable for use in the method shown in FIG. 4 include fluorinated acrylates (e.g., perfluorobutane acrylate and pentadecafluorooctyl acrylate), methacrylates (e.g., perfluorobutane methacrylate and trifluoroethyl methacrylate), acrylamides, methacrylamides, styrenes (e.g., pentafluorostyrene) and silanes. Suitable monomers and oligomers can have more than one reactive group, and these reactive groups may be of different chemistries on the same molecule. Mixtures of coating materials (e.g., mixtures of monomers or oligomers) may be employed. It can also be useful to coat reactive coating materials from the vapor phase onto a cube-corner optical element already having chemically reactive species on its surface, examples of such reactive species including monomers, oligomers, initiators, catalysts, water, or reactive groups such as hydroxy, carboxylic acid, isocyanate, acrylate, methacrylate, vinyl, epoxy, silyl, styryl, amino, melamine and aldehyde groups. These reactions can be initiated thermally or by radiation curing, with initiators and catalysts as appropriate to the chemistry or, in some cases, without initiators or catalysts. When more than one coating material is applied, the constituents may be vaporized and deposited together, or they can be vaporized from separate evaporation sources. The condensed, polymerized material can form a conformal polymer coating having a controlled chemical composition and which closely preserves the profile of the underlying cube-corner elements. The method shown in FIG. 4 can be performed at atmospheric pressure, optionally enclosing the coating region in a chamber 118 (e.g., for providing a clean environment, for providing an inert atmosphere, or for other such reasons), or at reduced pressure where chamber 118 is a vacuum chamber. Coating material 101, supplied in the form of a liquid monomer or prepolymer, can be metered into evaporator 102 via pump 104. The coating material 101 can be evaporated using any suitable technique, including flash evaporation and carrier gas collision vaporization. For example, coating material 101 may be atomized into fine droplets through optional nozzle 122, the droplets being subsequently vaporized inside evaporator 102. Optionally, a carrier gas 106 can be used to atomize the coating material and direct the droplets through nozzle 122 into evaporator 102. Vaporization of the liquid coating material, or droplets of the liquid coating material, can be performed via contact with the heated walls of the evaporator 102, via contact with the optional carrier gas 106 (optionally heated by heater 108), or via contact with some other heated surface. After vaporization, the coating material 101 can be directed through a coating die 110 and onto the cube-corner optical elements 111. A mask (not shown in FIG. 4) can optionally be placed between the coating die 110 and the retroreflective article 112 to coat selected portions of the cube-corner optical elements 111 or to coat selected cube-corner optical elements. The deposited coating material can be applied in a substantially uniform, substantially continuous fashion, or in a discontinuous manner, for example, as islands that cover only a selected portion or portions of the optical elements. Discontinuous applications can for example provide characters, numerals, or other indicia. Thicker layers can be formed by increasing the exposure time of the substrate to the vapor, by increasing the flow rate of the fluid composition to the atomizer, or by exposing the substrate to the coating material over multiple passes. Increasing the exposure time of the retroreflective article to the vapor can be achieved by adding multiple vapor sources to the system or by decreasing the speed at which the article travels through the system. Layered coatings of different materials can be formed by sequential coating depositions using a different coating material with each deposition, or by simultaneously depositing materials from different sources displaced from each other along the substrate travel path. Optionally, the surfaces of the cube-corner optical elements 111 can be pretreated using an electrical discharge source 120, such as a glow discharge source, silent discharge source, corona discharge source, or the like. The pretreatment step may optionally be performed to modify the cube-corner element surface, for example, to improve the coating material adhesion to the retroreflective article, or for other such purposes. In addition, the surfaces of the cube-corner optical elements 111 can optionally be pretreated with one or more layers of a transparent adhesion promoter. Retroreflective article 112 is preferably maintained at a temperature at or below the condensation temperature of the monomer or pre-polymer vapor exiting the coating die 110. Retroreflective article 112 can be placed on, or otherwise disposed in temporary relation to, the surface of drum 114. The drum 114 allows the retroreflective article 112 to be moved past the coating die 110 at a selected rate to control the layer thickness. The drum 114 can also be maintained at a suitable bias temperature to maintain the retroreflective article 112 at or below the pre-polymer vapor condensation temperature. After being applied on the optical elements 111, the coating material can be solidified. For coating materials containing radiation-curable or heat-curable monomers, a curing source 116 can be provided downstream to the coating die 110 in the drum rotation direction (indicated by arrow 124). Curing the coating material generally involves irradiating the material in situ using an energy source such as visible light, ultraviolet radiation, electron beam radiation, ion radiation or free radicals (as from a plasma), heat or any other suitable technique. Multiple revolutions of the drum can permit continuous deposition and cure of coating material vapor onto layers that were deposited and cured during previous revolutions. Curing may occur simultaneously with deposition, for example, when the cube-corner optical elements are already coated with a material that induces a curing reaction as the applied coating material contacts the cube-corner optical element surface. Thus, although described as separate steps, deposition and curing can occur together, temporally or physically.

Figure 5:
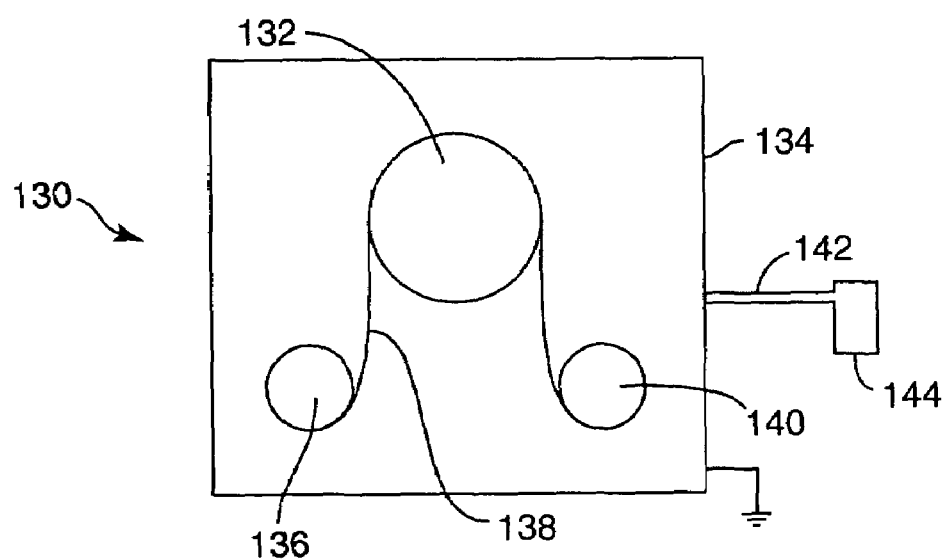
FIG. 5 is a schematic representation of a plasma treating apparatus useful in the disclosed invention.
Figure 6:
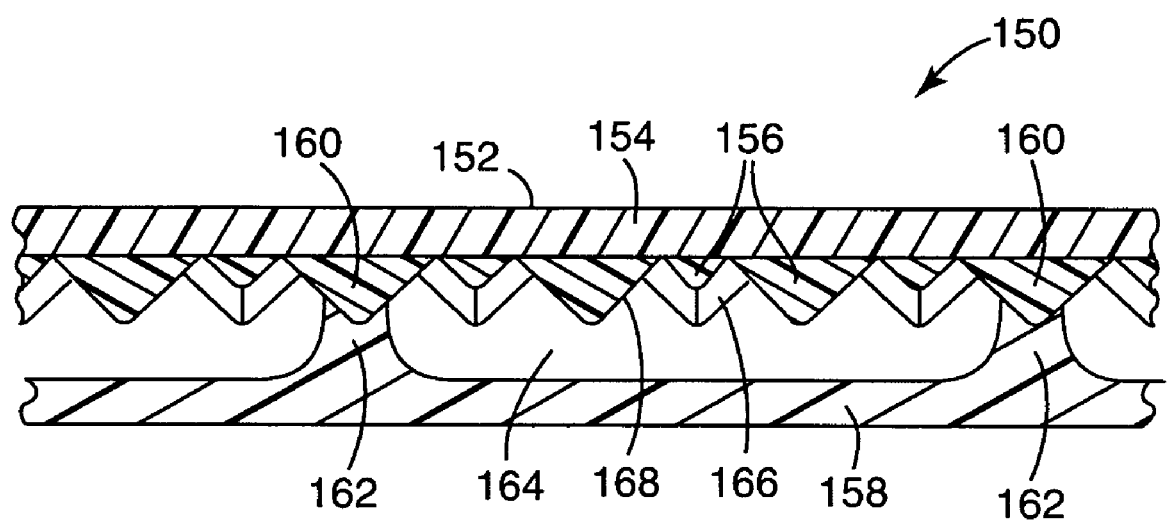
FIG. 6 is a cross-sectional representation of a prior art prismatic retroreflective article having cube-corner optical elements encased in sealed cells by a rear cover film.

FIG. 5 shows an apparatus 130 which may be used for plasma treatment, using techniques like those described in U.S. Pat. Nos. 5,888,594 and 5,948,166 and U.S. Patent Application Publication No. US 2003/0134515. Apparatus 130 includes rotating drum electrode 132 which may be powered by a radio frequency (RF) power source, grounded chamber 134 which acts as a grounded electrode, feed reel 136 which continuously supplies to-be-treated article 138 in the form of a continuous moving web, and take-up reel 140 which collects the treated article. Reels 136 and 140 are optionally enclosed within chamber 134, or can be operated outside chamber 134 as long as a low-pressure plasma can be maintained within chamber 134. If desired, a concentric grounded electrode (not shown in FIG. 5) can be added near powered drum electrode 132 for additional spacing control. A mask can be employed if desired to provide discontinuous treatment. An inlet 142 supplies a suitable treatment material 144 (e.g., a source of fluorine or silicon) in vapor or liquid form to chamber 134. Exemplary fluorine sources include compounds such as sulfur hexafluoride ($SF_6$); carbon tetrafluoride ($CF_4$); perfluoroethane ($C_2F_6$); isomeric forms of perfluoroalkanes such as perfluoropropane ($C_3F_8$), perfluorobutane ($C_4F_{10}$) and perfluoropentane ($C_5F_{12}$); and mixtures such as hexafluoropropylene (HFP) trimer (a mixture of perfluoro 2,3,5-trimethyl 3-hexene, perfluoro 2,3,5-trimethyl 2-hexene and perfluoro 2,4,5-trimethyl 2-hexene, available from 3M Company). Exemplary silicon sources include organosilanes such as trimethylsilane (SiH(CH₃)₃) or tetramethylsilane (Si(CH₃)₄).

The completed retroreflective article may be employed as is or mounted on a suitable support. A variety of supports may be used and will be familiar to those skilled in the art. Representative supports include woven, nonwoven or knit fabrics (e.g., as used in garments and footwear), plastics, leather, metals, tile, concrete, masonry and wood. A variety of mounting techniques may be employed and will be familiar to those skilled in the art. Representative mounting techniques include sewing, adhesives, welding (e.g., sonic welding) and fasteners (e.g., rivets).

The invention is further illustrated in the following illustrative examples, in which all parts and percentages are by weight unless otherwise indicated.

EXAMPLE 1

Samples of unsealed cube-corner retroreflective sheeting (having a body layer made from a 0.05 mm thick polyethylene terephthalate glossy top film heat laminated to a 0.11 mm thick polyvinyl chloride film and against which were formed 0.09 mm high UV-cured acrylic cube-corner elements) were plasma-treated in an apparatus like that shown in FIG. 5 using the various treatment conditions shown below in Table I:

TABLE I

| Run No. | Treatment Material | Flow Rate, scm³ | Pressure, mTorr | Plasma Power, W | Line Speed, m/min. |
| --- | --- | --- | --- | --- | --- |
| 1-1 | Perfluoropropane | 600 | 300 | 2500 | 1.5 |
| 1-2 | Perfluoropropane | 600 | 300 | 2500 | 6 |
| 1-3 | Tetramethylsilane | 444 | 50–100 | 200 | 1.5 |
| 1-4 | Tetramethylsilane | 444 | 50–100 | 200 | 6 |

The treated samples were placed flat on a horizontal surface with the cube-corner optical elements facing up. A series of isopropyl alcohol/water mixtures containing 0 to 100 percent isopropyl alcohol and 100 to 0 percent water in 10 percent increments was applied to the treated samples and to a similarly positioned untreated sample. None of the alcohol/water mixtures wet out the cube-corner optical elements. Instead the mixtures beaded up, minimizing the area in contact with the liquid and largely preserving retroreflectivity. The untreated sample was however wetted by the 60/40 isopropyl alcohol/water mixture and by mixtures containing greater amounts of isopropyl alcohol, resulting in thin liquid films spread over the cube-corner optical elements and a substantial retroreflectivity loss.

The treated and untreated samples were next hung vertically. None of the alcohol/water mixtures wet out the cube-corner optical elements. Instead, the mixtures flowed off the cube corner sheeting and onto the counter below. Inspection of the treated samples using a hand illuminator showed that they remained strongly retroreflective. The untreated sample was wetted by all of the alcohol/water mixtures, and when wetted was no longer retroreflective.

The treated and untreated samples were analyzed using time-of-flight secondary ion mass spectrometry (TOF-SIMS). Positive and negative ion analyses were performed using a pulsed 25 keV Au+ primary ion beam, with a beam diameter of about 3 µm, and an analysis area of 500×500 µm. The TOF-SIMS analytical technique has monolayer sensitivity, with an analysis depth in the range of 10 to 20 Å. The untreated samples showed no evidence of fluorination, and a trace level of silicone. The silicone was believed to be a minor amount of unbound (viz., not covalently bonded to the cube-corner optical elements) polydimethylsiloxane, as a surface contaminant. The Run 1-1 and Run 1-2 samples exhibited extensive (and similar) fluorination, believed to be in the form of a fluoropolymer overlayer with extensive branching. The Run 1-3 and Run 1-4 samples exhibited extensive (and similar) silanation, believed to be in the form of a relatively low molecular weight material resembling polydimethylsiloxane, but with some substitution of H for CH₃ along the —Si—O—Si— backbone and with the possible presence of linear, branched, or cyclic moieties.

EXAMPLE 2

Samples of unsealed cube-corner retroreflective sheeting (having a body layer made from a 0.19 mm thick plasticized polyvinyl chloride film against which were formed 0.09 mm high UV-cured cube-corner elements similar to those employed in Example 2, Composition C-2 of U.S. Pat. No. 5,691,846, but using hexanediol diacrylate in place of tetrahydrofurfuryl acrylate) were plasma-treated in an apparatus like that shown in FIG. 5 using the various treatment conditions shown below in Table II.

TABLE II

| Run No. | Treatment Material | Flow Rate, scm³ | Pressure, mTorr | Plasma Power, W | Line Speed, m/min. |
| --- | --- | --- | --- | --- | --- |
| 2-1 | Perfluoropropane | 600 | 500 | 2250 | 3 |
| 2-2 (1st pass) | Oxygen | 1500 | 150 | 1250 | 12.2 |
| 2-2 (2nd pass) | Perfluoropropane | 600 | 150 | 2500 | 12.2 |
| 2-3 | Tetramethylsilane/Oxygen | 444/250 | 75 | 4000 | 6.1 |
| 2-4 (1st pass) | Oxygen | 1500 | 150 | 4000 | 12.2 |
| 2-4 (2nd pass) | Tetramethylsilane/Oxygen | 444/250 | 75 | 4000 | 6.1 |

The cube side of the Run 2-1 and 2-2 samples was exposed to water, mineral oil, kerosene, mineral spirits and isopropanol. None of the applied liquids wet out the cube-corner optical elements. Instead the applied liquids beaded up, minimizing the area in contact with the liquid and largely preserving retroreflectivity. The cube side of the Run 2-3 and 2-4 samples was exposed to the same liquids. Water and mineral oil did not wet out the cube-corner optical elements, but kerosene, mineral spirits and isopropanol did do so. The cube side of the Run 2-5 sample was exposed to the same liquids. Water, mineral oil and kerosene did not wet out the cube-corner optical elements, but mineral spirits and isopropanol did do so. When the same liquids were applied to an untreated retroreflective sheeting sample, all of the liquids wet out the cube-corner optical elements.

The treated and untreated samples were each stitched to a lightweight polyester knit fabric used in safety vests, then subjected to a water shower test and measured for retroreflectivity according to Annex D ("Method of measuring wet retroreflective performance") of European Standard EN-471 ("High visibility warning clothing for professional use—Test methods and requirements"). The treated and untreated samples were next laundered according to ISO 6330 ("Textiles—Domestic washing and drying procedures for textile testing"), using a 60° C. wash cycle followed by a 50° C. drying cycle, then remeasured for retroreflectivity. The Run 2-1 sample was subjected to additional laundering and retroreflectivity measurements, with new retroreflectivity measurements being taken at increments of five 60° C. wash cycles followed by one 50° C. drying cycle. The retroreflectivity results were expressed as a fraction calculated as follows:

Performance Improvement=((Treated−Control)/Control)×100

The results are set out below in Table III:

TABLE III

| Run No. | Performance Improvement | | | | | | |
|---|---|---|---|---|---|---|---|
| | Initial | After Laundering, Wash Cycles | | | | | |
| | | 1 | 5 | 10 | 15 | 20 | 25 |
| 2-1 | +393% | +370% | +276% | +452% | +150% | +248% | +680% |
| 2-2 | +787% | +309% | | | | | |
| 2-3 | +609% | +112% | | | | | |
| 2-4 | +526% | −91% | | | | | |

The Run 2-4 sample showed decreased performance compared to the untreated control after one laundering. All other comparisons showed a significant performance improvement compared to the untreated control. The Run 2-1 sample also demonstrated very good durability.

All references cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the invention is not to be limited only by the claims provided below.

We claim:

1. A prismatic retroreflective article comprising a transparent body portion and a layer of internally reflecting cube-corner optical elements having an open air-exposed rear surface at least a portion of which is more hydrophobic, more oleophobic, or both more hydrophobic and more oleophobic than the underlying cube-corner optical element.

2. A retroreflective article according to claim 1, comprising cube-corner optical element rear surfaces bearing a transparent conformal coating.

3. A retroreflective article according to claim 2, wherein the cube-corner elements have a characteristic height and the coating has a thickness less than about 10% of the cube-corner optical element characteristic height.

4. A retroreflective article according to claim 2, wherein the cube-corner elements have a characteristic height and the coating has a thickness less than about 5% of the cube-corner optical element characteristic height.

5. A retroreflective article according to claim 2, wherein the coating has a thickness less than about 3 μm.

6. A retroreflective article according to claim 1, wherein water or mineral oil will bead up rather than spreading when applied to the cube-corner optical elements.

7. A retroreflective article according to claim 1, wherein water and mineral oil will bead up rather than spreading when applied to the cube-corner optical elements.

8. A retroreflective article according to claim 1, comprising cube-corner optical elements having an increased number of fluorine or silicon atoms at the exposed cube-corner element surface compared to the underlying cube-corner optical element.

9. A retroreflective article according to claim 1, further comprising a support on which the retroreflective article is mounted while leaving the cube-corner optical elements exposed to the open air.

10. A retroreflective article according to claim 9, wherein the support comprises a fabric.

11. A method for making a prismatic retroreflective article comprising providing a transparent body portion bearing a layer of internally reflecting open air-exposed cube-corner optical elements; treating or coating at least a portion of the cube-corner optical elements to make the treated or coated portion more hydrophobic, more oleophobic, or both more hydrophobic and more oleophobic than the underlying cube-corner optical elements; and leaving such treated or coated portion exposed to the open air.

12. A method according to claim 11, comprising treating the cube-corner optical elements by condensing and polymerizing vapors of a fluorochemical acrylate, fluorochemical methacrylate, acrylic-functional siloxane or methacrylic-functional siloxane on the surface of the cube-corner elements.

13. A method according to claim 11, comprising treating the cube-corner optical elements by coating them with a fluoro/silane-containing ceramer hardcoat; a transparent ceramer hardcoat followed by a solvent-borne fluorine-containing or silicon-containing antisoiling layer; a self-assembling fluorine- or silicon-containing monomolecular antisoiling layer; a solution of a low surface energy polymer; a solution containing a silane coupling agent; a polymerized siloxane; a silazane; or an organometallic material.

14. A method according to claim 11, comprising treating the cube-corner optical elements with fluorine gas, fluorine atoms or silicon atoms using plasma, glow discharge or corona discharge.

15. A method according to claim 14, comprising treating the cube-corner optical elements with a perfluoroalkane.

16. A method according to claim 15, wherein the perfluoroalkane comprises perfluoropropane or perfluorobutane.

17. A method according to claim 14, comprising treating the cube-corner optical elements with a silane.

18. A method according to claim 17, wherein the silane comprises tetramethylsilane.

19. A method according to claim 11, further comprising applying an adhesion promoter to the layer of optical elements before treating or coating them.

20. A method according to claim 11, further comprising mounting the article on a support while leaving the cube-corner optical elements exposed to the open air.

21. A method according to claim 20, wherein the support comprises a fabric.

* * * * *